United States Patent [19]
Brzozowski et al.

[11] 3,856,556
[45] Dec. 24, 1974

[54] PROCESS FOR THE MANUFACTURE OF CHEMICAL RESISTANT POLYARYLATE FILMS AND COATINGS

[75] Inventors: Zbigniew K. Brzozowski; Stanislaw Porejko; Janusz Kaczorowski; Jedrzej Kielkiewicz, all of Warszawa, Poland

[73] Assignee: Politechnika Warszawska, Warszawa, Poland

[22] Filed: Mar. 8, 1973

[21] Appl. No.: 339,053

[30] Foreign Application Priority Data
Mar. 15, 1972  Poland .................................. 154073
Apr. 27, 1972  Poland .................................. 155001

[52] U.S. Cl. ............. 117/62, 117/119.6, 117/119.8, 117/161 K, 260/47 UA, 260/619 A
[51] Int. Cl. ........................................... B44d 1/46
[58] Field of Search ................... 260/47 UA, 619 A; 117/161 K, 119.8, 119.6, 62

[56] References Cited
UNITED STATES PATENTS
3,216,970  11/1965  Conix .......................... 260/619 A X
3,248,366  4/1966  Schmitt et al ................ 260/619 A X
3,517,071  6/1970  Caldwell et al ............... 117/161 K X
3,663,602  5/1972  Steinman ..................... 260/619 A X Primary Examiner—William D. Martin
Assistant Examiner—Dennis C. Konopacki
Attorney, Agent, or Firm—Waters, Roditi, Schwartz & Nissen

[57] ABSTRACT

The process for the manufacture of chemical resistant polyarylate films and coatings obtained by dissolving the polyarylate in a mixture of typical solvents and forming the same by evaporating said solvents, consists in additionally conditioning the films and coatings at a temperature of 135–320°C for 1–10 hours. The conditioning process is applied to polyarylates containing in the main chain a group in which the carbon atom between two aryl rings is connected to a $CCl_2$-group by a double bond.

4 Claims, No Drawings

PROCESS FOR THE MANUFACTURE OF CHEMICAL RESISTANT POLYARYLATE FILMS AND COATINGS

This invention relates to a process for the manufacture of chemical resistant, self-extinguishing polyarylate films and coatings which are used as protective layers on metal, ceramic, wooden and other surfaces.

BACKGROUND OF THE INVENTION

Hitherto known methods of producing polyarylate films and coatings consist in dissolving the polyarylate in a mixture of typical organic solvents, mostly in a mixture of methylene chloride and tetrachloroethane, and in pouring it on an exactly levelled mirror-plate placed in an insulated, sealed chamber with forced air circulation. Under such conditions the polyarylate solution evaporates within 24 hours, whereupon the film is dried at a temperature of 80°C. during the next 24 hours and soaked for 1 - 3 hours at a temperature of 130°C. The polyarylate films thus obtained are characterized by a relatively high thermoresistance, and good mechanical, optical and dielectric properties; nevertheless they are not sufficiently chemical resistant, especially as far as chlorinated aliphatic hydrocarbons are concerned, which considerably limits the possibilities for their utilization.

SUMMARY OF THE INVENTION

The object of this invention is to provide a technologically simple method for the production of polyarylate films and coatings which apart from a high thermoresistance, and good mechanical, optical and dielectric properties are also resistant against the action of chemical reagents, primarily against organic solvents.

It has been found that this object can be attained by the additional conditioning of the films and coatings made of polyarylates, which conditioning consists in heating them at a temperature of 135°-320°C for 1 - 10 hours.

However, it has been found that not all polyarylates subjected to conditioning under such conditions become chemical resistant. The process according to this invention refers to polyarylates containing in the normal chain a group in which the carbon atom between two aryl rings with substituents or without substituents is connected by a double bond to a $CCl_2$ group. Such polyarylates are obtainable by the polycondensation of chlorobisphenols or their mixture or of a mixture of chlorobisphenols with bis(hydroxyaryl)alkanes and dicarboxylic acid chlorides or their mixtures, or dicarboxylic acid esters or their mixtures. These may also be polyarylates obtained by polycondensation of chlorobisphenol diesters or their mixtures or of mixtures of chlorobisphenol diesters with diesters of bis(hydroxyaryl)alkanes and dicarboxylic acids or their mixtures.

However at least one of these chlorobisphenols and respectively, at least one of the chlorobisphenol diesters, has a group in which the carbon atom between two aryl rings with substituents or without substituents is connected by a double bond to a $CCl_2$ group.

As the components containing this characteristic group the following chlorobisphenols may be used: 2,2-bis(4-hydroxyphenyl)-1,1-dichloroethylene; 2,2-bis(3,5-dichloro-4-hydroxyphenyl)-1,1-dichloroethylene; 2,2-bis(3-methyl-4-hydroxyphenyl)-1,1-dichloroethylene or 2,2-bis(4-hydroxynaphthyl)-1,1-dichloroethylene or acetates of these chlorobisphenols.

As the bis(hydroxyaryl) alkanes bis(hydroxyphenyl)-alkanes, bis(hydroxynaphthyl)alkanes, phthaleins or anthrahydroquinones may be used.

Of special advantage is the production of chemical resistant films and coatings when use is made of the polyarylate obtained by the interfacial polycondensation of 2,2-bis(4-hydroxy-phenyl)-1,1-dichloroethylene or its mixture with 2,2-bis(4-hydroxyphenyl)propane and tere- and isophthalic acid chlorides.

The method according to this invention is characterized by a high technological simplicity and the films and coatings obtained, apart from good mechanical, dielectric and thermal properties, reveal a very good chemical resistance, particularly in relation to chlorinated aliphatic hydrocarbons.

The object of the invention is more fully explained on the base of examples of execution which however do not limit its scope.

DETAILED DESCRIPTION OF PREFERRED EMBODIMENTS

EXAMPLE I.

2 g of the polyarylate obtained from 2,2-bis(hydroxyphenyl)-1,1-dichloroethylene and a mixture of tere- and isophthalic acid chlorides were dissolved in a mixture composed of 60 ml of methylene chloride and 40 ml of tetrachloroethane. After the polymer was completely dissolved, the solution was filtered and then poured on a precisely levelled mirror plate which was placed in an insulated, sealed chamber with forced air circulation. Under such conditions the polyarylate solution was evaporated during 24 hours and then dried at a temperature of 80°C for 24 hours, whereupon it was subjected to soaking at a temperature of 120°C for 5 hours. The soaked foil was additionally subjected to conditioning for 5 hours at a temperature of 180°C. The film obtained was fully resistant to the action of tetrachloroethane, chloroform and other chlorinated aliphatic hydrocarbons, whereas an unconditioned film did not reveal resistance to the action of these solvents.

EXAMPLE II.

2 g of the polyarylate obtained from a mixture of 2,2-bis(3,5-dichloro-4-hydroxyphenyl)-1,1-dichloroethylene and 2,2-bis(hydroxyphenyl)propane and a mixture of tere- and iso-phthalic acid chlorides were dissolved in tetrachloroethane. The filtered solution was poured into a pouring basin and then subjected to drying for 24 hours at room temperature and then at a temperature of 120°C for 5 hours. The soaked film was subjected to additional conditioning for 2 hours at a temperature of 260°C.

The conditioned film was fully resistant to the action of solvents.

EXAMPLE III.

3 g of the polyarylate obtained from a mixture of 2,2-bis(4-hydroxyphenyl)-1,1-dichloroethylene diacetate with 2,2-bis(4-hydroxyphenyl)-propane diacetate and a mixture of tere- and isophthalic acids were dissolved in a mixture composed of 50 ml of methylene chloride and 50 ml of tetrachloroethane. The obtained polymer solution was filtered and poured on a levelled glass plate placed in an isolated chamber. After evaporation of the solvents, the obtained polyarylate film was dried first at a temperature of 80°C for 24 hours and then at a temperature of 120°C for 5 hours. The dried film was subjected to additional conditioning for 6 hours at a temperature of 200°C.

Apart from good mechanical and dielectric properties, the film obtained was fully resistant to the action of organic solvents, including tetrachloroethane, methylene chloride and chloroform.

EXAMPLE IV.

The process of Example III was used except that 3 g of polyarylate was used which had been obtained from a mixture of 2,2-bis(3-methyl-4-hydroxyphenyl)-1,1-dichloroethylene with 2,2-bis(4-hydroxynaphthyl)methane and a mixture of terephthalic acid methyl ester and isophthalic acid methyl ester.

We claim:

1. A process for the manufacture of a chemical resistant, self-extinguishing polyarylate film or coating formed from a polyarylate based on a chlorobisphenol or ester thereof in which the carbon atom between two aryl rings with substituents or without substituents is connected by a double bond to a $CCl_2$ group comprising subjecting said film or coating to a temperature of 135°–320°C for 1 to 10 hours.

2. A process according to claim 1 wherein the polyarylate is the condensation product of said chlorobisphenol or a mixture of said chlorobisphenol with a bis(hydroxyaryl)alkane and at least one dicarboxylic acid chloride or ester.

3. A process according to claim 2 wherein the bis(hydroxyaryl)alkane is selected from the group consisting of bis(hydroxyphenyl)alkanes, bis(hydroxynaphthyl)alkanes, phthaleins and anthrahydroquinones.

4. A process according to claim 3 wherein the chlorobisphenol is a mixture of 2,2-bis(4-hydroxyphenyl)-1,1-dichloroethylene and 2,2-bis(4-hydroxyphenol)propane.

* * * * *